United States Patent
Kiperberg et al.

(10) Patent No.: US 9,753,865 B2
(45) Date of Patent: *Sep. 5, 2017

(54) SYSTEM AND METHODS FOR EXECUTING ENCRYPTED CODE

(71) Applicant: TRULY PROTECT OY, Jyväskylä (FI)

(72) Inventors: Michael Kiperberg, Ashkelon (IL); Amit Resh, Even Yehuda (IL); Nezer Zaidenberg, Hod Hasharon (IL)

(73) Assignee: TRULY PROTECT OY, Jyväskylä (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/262,026

(22) Filed: Sep. 12, 2016

(65) Prior Publication Data

US 2016/0378690 A1    Dec. 29, 2016

Related U.S. Application Data

(63) Continuation of application No. 14/088,405, filed on Nov. 24, 2013, now Pat. No. 9,471,511.

(51) Int. Cl.
| | |
|---|---|
| *G06F 12/08* | (2016.01) |
| *G06F 12/14* | (2006.01) |
| *G06F 12/0888* | (2016.01) |
| *G06F 12/0802* | (2016.01) |
| *G06F 12/1027* | (2016.01) |

(52) U.S. Cl.
CPC ...... *G06F 12/1408* (2013.01); *G06F 12/0802* (2013.01); *G06F 12/0888* (2013.01); *G06F 12/1027* (2013.01); *G06F 2212/1052* (2013.01); *G06F 2212/402* (2013.01)

(58) Field of Classification Search
CPC ............ G06F 12/0888; G06F 12/1408; G06F 12/0802; G06F 12/1027; G06F 2212/1052; G06F 2212/402
See application file for complete search history.

(56) References Cited

U.S. PATENT DOCUMENTS

| | | | |
|---|---|---|---|
| 2010/0042846 A1* | 2/2010 | Trotter | ............... G06F 21/31 713/182 |
| 2014/0006805 A1* | 1/2014 | Colp | ............... G06F 12/1425 713/193 |

* cited by examiner

*Primary Examiner* — Hiep Nguyen
(74) *Attorney, Agent, or Firm* — Yagod Morris & Associates

(57) ABSTRACT

The present disclosure relates systems and methods for executing an encrypted code section in a shieldable CPU memory cache. Functional characteristics of the software product of a vendor, such as gaming or video, may be partially encrypted to allow for protected and functional operability and avoid hacking and malicious usage of non-licensed user. The encrypted instructions may be written to the CPU memory cache and decrypted only once the CPU memory cache is switched into a shielded state. The decrypted code instructions may be executed from a designated cache-line of said CPU memory cache still in the shielded state.

20 Claims, 9 Drawing Sheets

SYSTEM AND METHODS FOR EXECUTING ENCRYPTED CODE

CROSS-REFERENCE TO RELATED APPLICATIONS

This application is a Continuation of Applicant's co-pending U.S. patent application Ser. No. 14/088,405 filed Nov. 24, 2013, the contents of which are incorporated herein by reference in their entirety.

FIELD OF THE DISCLOSURE

The disclosure herein relates to system and software-based management of cache pinning and buffered software execution which may be triggered when an encrypted section of code is accessed. In particular the disclosure relates to preventing protected data-blocks from being evicted from the central processing unit (CPU) memory cache.

BACKGROUND

Digital content such as games, videos and the like may be susceptible to unlicensed usage, having significant adverse impact on the profitability and commercial viability of such products. Commonly, such commercial digital content may be protected by a licensing verification program; however these may be circumvented by reverse engineering of the software instructions of the computer program which leaves them vulnerable to misuse.

One way of preventing circumventing of the software licensing program, may use a method of "obfuscation". The term obfuscation refers to making software instructions difficult for humans to understand by deliberately cluttering the code with useless, confusing pieces of additional software syntax or instructions. However, even when changing the software code and making it obfuscated, the content is still readable to the skilled hacker.

Additionally, publishers may protect their digital content product by encryption, using a unique key to convert the software code to an unreadable format, such that only the owner of the unique key may decrypt the software code. Such protection may only be effective when the unique key is kept secured and unreachable to an unwanted party. Hardware based methods for keeping the unique key secured are possible, but may have significant deficiencies, mainly due to an investment required in dedicated hardware on the user side, making it costly, and therefore, impractical. Furthermore, such hardware methods have been successfully attacked by hackers.

Software copy-protection is currently predominantly governed by methodologies based on obfuscation, which are volatile to hacking or user malicious activities. There is therefore a need for a better technique for protecting sensitive software sections, such as licensing code. The present disclosure addresses this need.

SUMMARY

The current disclosure, addresses various vulnerabilities of protected data decrypted on a user system. In some software-based methods of encrypting and decrypting digital content, the decryption is performed in the client system's CPU. Yet, such methods may remain susceptible to hacking, since the CPU's content is synchronized with other sections of the client system's memory with respect to the decrypted content. Further, many methods are vulnerable to decryption by software which imitates the functionality of hardware. Failure to test these conditions may expose existing software-based protection methods to security failure.

The disclosure herein relates to system and software-based management of cache pinning initiated or triggered by an encrypted section of code and may be coupled with buffered software code execution. In particular the disclosure relates to preventing protected data-blocks from being altered and evicted from the CPU memory cache.

Accordingly, this disclosure may provide a feasible solution for keeping decrypted code in cache and avoiding eviction of protected data-blocks, such as by providing a technique for protected license checking based upon cache pinning initiated when caching of an encrypted section by a runtime module.

According to one aspect of the disclosure a method is hereby taught for preventing a protected data-block from being evicted from a CPU memory cache. The cache comprising a plurality of cache-lines, each cache-line comprising a plurality of data-blocks, the method comprising: writing the protected data-block to a designated cache-line; identifying a set of conflicting data-blocks having a memory mapping indication to the designated cache-line; and preventing the set of conflicting data-block from being cached.

The method of preventing a protected data-block from being evicted from a CPU memory cache, wherein the step of writing the protected data-block to a designated cache-line, comprises: obtaining an encrypted data-block; placing the encrypted data-block in a free-location of the designated cache-line; receiving a decryption key; and decrypting the encrypted data-block using the retrieved decryption key.

The method of preventing a protected data-block from being evicted from a CPU memory cache, wherein referencing preventing the set of conflicting data-blocks from being cached comprises changing a cacheability-state flag associated with each data-block in the set of conflicting data-blocks from a CACHEABLE state to a NON-CACHEABLE state.

It may be noted that wherein referenced CACHEABLE state, may be configured to use the existing current caching access policy, as further described herein.

The method of preventing a protected data-block from being evicted from a CPU memory cache, wherein referencing the step of preventing the set of conflicting data-blocks from being cached comprises filtering data block access requests.

Accordingly, the step of filtering data block access requests further comprises the steps of: receiving an access request to cache a pending data block; checking the memory mapping indication of the pending data block; and rejecting the access request, if the pending data block has a memory mapping indication to the mapping indication of the memory designated cache-line.

Optionally, the method of preventing a protected data-block from being evicted from a CPU memory cache may further comprise the step of changing the memory mapping indication of the set of conflicting data blocks such that the set of conflicting data blocks is converted into non-conflicting data blocks.

Accordingly, the step of changing memory mapping indication of the set of conflicting data blocks may further comprise the steps of: calculating a new designated cache-line; and writing the set of conflicting data-blocks to the new designated cache-line.

Further, the step preventing the set of conflicting data-blocks from being cached, of the method of preventing a protected data-block from being evicted from a CPU memory cache, comprises changing a memory attribute associated with the conflicting data-blocks specifying current caching access policy to a NON-CACHEABLE state.

Additionally, the method of preventing a protected data-block from being evicted from a CPU memory cache may be triggered when an encrypted section of code is accessed.

The method of preventing a protected data-block from being evicted from a CPU memory cache, wherein referencing the set of conflicting data-block comprises all data-blocks having a memory mapping indication to said designated cache-line.

In another aspect of the disclosure a method is taught for protecting a line a CPU memory cache, the method comprising: receiving a request to write from a protected data-block to a designated cache-line, where the designated cache-line being in an unprotected state; saving the protected data-block to the designated cache-line; and changing caching policy of conflicting data blocks to prevent the conflicting data-blocks from being written to the designated cache-line thereby changing the designated cache-line into a protected state; such that the protected data-block is not evicted from the cache.

As appropriate, the method for protecting a line of a CPU memory cache, wherein referencing the step of changing caching policy comprises: identifying a set of the conflicting data-blocks having a memory mapping indication to the designated cache-line; and changing a cachebility-state flag associated with the set of conflicting data-blocks from a CACHEABLE state to a NON-CACHEABLE state.

As appropriate, the method wherein changing caching policy comprises: receiving a write request to cache a pending data-block; checking memory mapping indication of the pending data-block; and rejecting the write request, if the pending data-block has a memory mapping indication to the designated cache-line.

Additionally and where appropriate, the method may further comprise changing the memory mapping indication of the pending data-block such that the pending data-block is stored in another line of the CPU memory cache.

In yet another aspect of the disclosure another method is taught for executing an encrypted code section in the CPU memory cache, where the encrypted code section comprising a plurality of encrypted code instructions, the method comprising: writing the encrypted code section to the CPU memory cache; changing said CPU memory cache into a shielded state; decrypting the encrypted code section; storing the decrypted code instructions of the encrypted code section into the CPU memory cache; and executing the decrypted code instructions from the designated cache-line in the CPU memory cache being in shielded state.

Additionally, the method of executing an encrypted code section may further comprise deleting the decrypted code from the CPU memory cache following execution of the decrypted code.

Where appropriate, the method of executing an encrypted code section may comprise restoring the CPU memory cache state to the unshielded state following the deleting of the decrypted code.

Additionally and as appropriate, wherein referencing unshielded state, is characterised by at least one of preemption and CPU interrupt handler being enabled.

Additionally and as appropriate, wherein referencing shielded state, is characterised by at least one of preemption and CPU interrupt handler being disabled.

The method for executing buffered encrypted code section in the CPU memory cache, wherein the step of decrypting the encrypted code section further comprises obtaining an encryption key, wherein the encryption key is stored in a CPU register.

It is noted that in order to implement the methods or systems of the disclosure, various tasks may be performed or completed manually, automatically, or combinations thereof. Moreover, according to selected instrumentation and equipment of particular embodiments of the methods or systems of the disclosure, some tasks may be implemented by hardware, software, firmware or combinations thereof using an operating system. For example, hardware may be implemented as a chip or a circuit such as an ASIC, integrated circuit or the like. As software, selected tasks according to embodiments of the disclosure may be implemented as a plurality of software instructions being executed by a computing device using any suitable operating system.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data. Optionally, a network connection may additionally or alternatively be provided. User interface devices may be provided such as visual displays, audio output devices, tactile outputs and the like. Furthermore, as required user input devices may be provided such as keyboards, cameras, microphones, accelerometers, motion detectors or pointing devices such as mice, roller balls, touch pads, touch sensitive screens or the like.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings.

DETAILED DESCRIPTION

Figure 1:
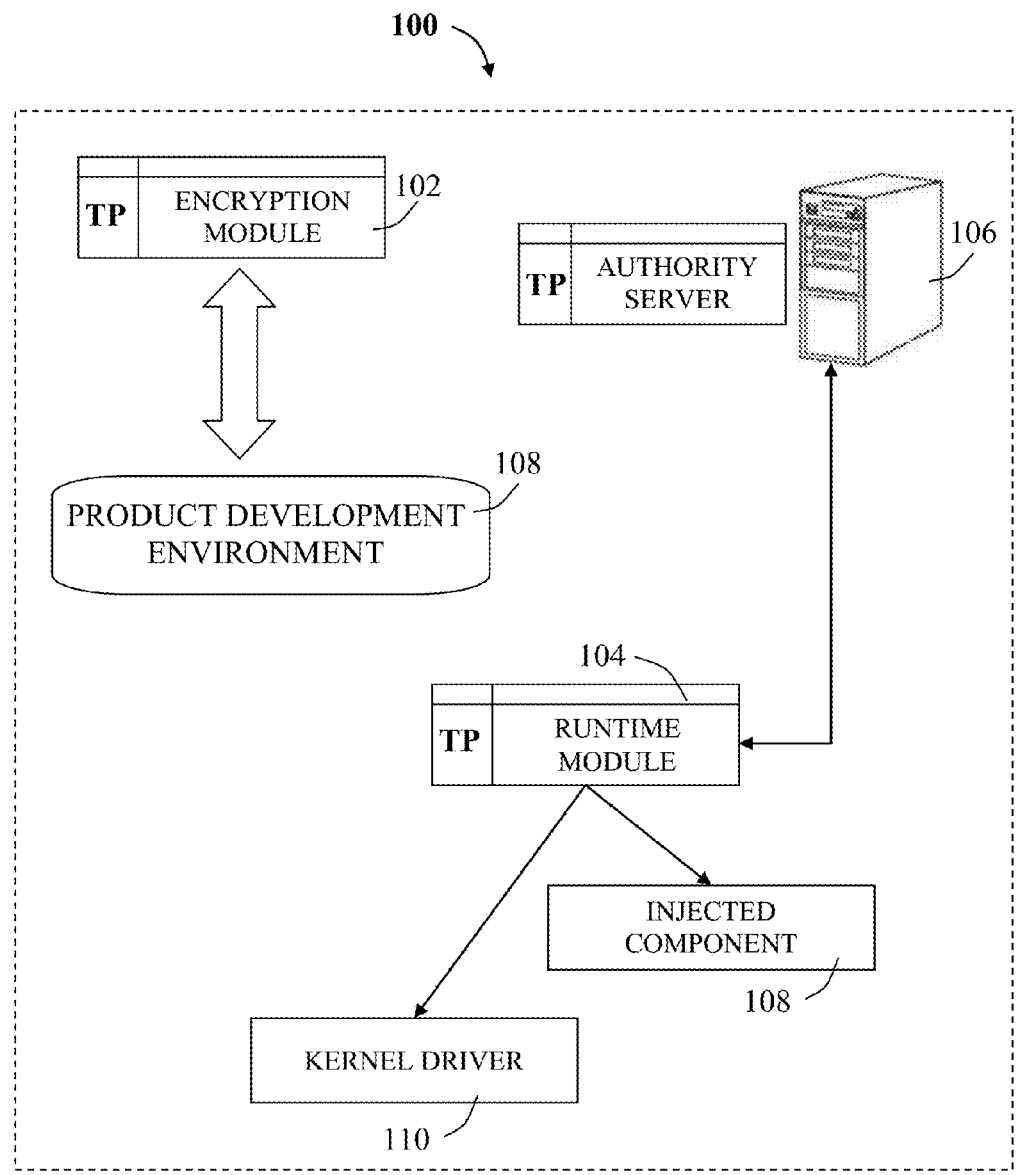
FIG. 1 is a schematic block diagram of the main module components representing the system architecture for software copy-protection used for secure software distribution.

Aspects of the present disclosure relate to techniques for ensuring that a given set of protected data blocks are not accessible from the main memory, by using a system and software-based management of cache pinning triggered by an encrypted section of code.

Embodiments described herein disclose a software copy-protection system based on modern cryptography to ensure that the license check code for software based products is executed successfully and not bypassed or circumvented. In particular, the disclosure prevents protected data blocks from being evicted from the CPU cache, by identifying the set of conflicting data blocks which may share a memory cache line with the protected data blocks, thereafter making the regions of memory containing conflicting data blocks non-cacheable.

Software copy-protection is currently predominantly governed by methodologies based on obfuscation, which are vulnerable to hacking. Hackers have demonstrated they can break these methodologies within several weeks from release. The current disclosure offers a different approach to software copy-protection, providing a system and methods based on encrypting critical software product functionality. Accordingly, the critical software section may be decrypted to store the decrypted data-blocks in memory cache, while making the conflicting data-blocks un-cacheable, and thus avoiding cache eviction of the protected data-blocks.

Caching Functionality:

A central processing unit (CPU) is designed with a memory hierarchy organized into several levels, each of which is smaller but faster than the level below. The cache is the memory level between CPU and main memory and may be used by the CPU of a computer to reduce the average time of accessing memory, increasing the data execution speed. The cache is divided into lines, which is the unit data transfer between the memory and the cache. Once a line reaches the cache, any access to the data elements in the line is a cache hit, and if a data element is not found, a cache miss occurs. As the cache size is smaller than main memory, when new data is brought in, some of the data stored in the cache may need to be replaced.

Typically, the memory cache sub-system in modern CPUs consists of at least three levels, specified as L1, L2 and L3.

The CPU further maintains an inclusion consistency between memory cache levels such that L3 contains all the data content of L2 and L2 contains all the data content of L1. Therefore, L3 is the largest level but slower compared to L1 and L2. The L1 can be accessed very quickly by the CPU, so it's a good place to keep the code and data that the CPU is most likely to request It is noted that the L1 may be accessed very quickly by the CPU, so the code and data that the CPU is most likely to request may be kept there. When the CPU needs data, it may check the smaller cache L1 first. If the L1 misses (cache miss) then the CPU may further check L2. If another miss occurs, then L3 is being checked before finally looking in system's main memory.

The CPU is operable to fill the memory cache with data content of main memory when the data is accessed, but only if the data content resides in a cacheable memory region. If the data content is already cached, then the CPU may use the data content directly from memory cache without accessing main memory. Accordingly, for determining whether some data content exists in memory cache, every block of data stored in memory cache is tagged by its address.

Where appropriate, there may be personalized license schemes associated with a software package, such as gaming software, media software, functional software applications or the like. The license scheme may further be tied to user credentials, and may be referred to as a license check. Additionally, the target computer system may contain a location where keys may be hidden. Such locations commonly exist in modern desktop CPU as well as many modern devices using technologies like near field communication (NFC) or trusted platform modules (TPM) modules.

It is noted that the target computer system may be validated to be a real machine, not a virtual machine (VM) such as emulators, simulators, or having any hypervisors installed. Thus the stored decryption keys may remain hidden, in a CPU register, for example. The architecture of the systems and methods described herein may provide the necessary tools for such validity check.

Wherein referenced, a hypervisor is software that may be executed by the CPU with privileges greater than those granted to the operating system. A hypervisor may intercept access to important resources inside the CPU.

System's Architecture:

It is noted that the system software architecture provides the development and runtime environments for executing checks of the protected data-blocks successfully, avoiding bypassing or circumventing by any unwanted party.

The distributed system's architecture, as described hereinafter with reference to FIG. 1, comprises of three main module components: an encryption module component 102, a runtime module component 104 and an authority server component 106. The encryption module 102 may allow for integration with the customer's development environment to produce encrypted source code instead of standard executable machine code. The runtime module 104 is structured in two parts, where the first sub-component 108 may be injected into the product encrypted executable and the second sub-component 110 may act as the kernel driver on the target computer system, operable in kernel mode (privilege ring 0). The authority server 106 is configured to provide the necessary decryption key for the software to operate correctly.

Optionally, encrypting the whole source code is possible, but generally does not contribute effectively and may further, incur a degree of performance degradation. In practice, encrypting only a set of critical executable functions to allow for the license check and software to function properly, may be sufficient.

Optionally again, a two layered encryption may be used in which a section of protected code, say a section including the critical functions, may be encrypted with a first key to produce a first level encrypted executable file. Furthermore, the first level encrypted executable file may be further encrypted by a second key to produce a second level encrypted executable file. It is noted that even if the second key is obtained, or the first level encrypted executable file is obtained by some means, the encrypted section of protected data will still require the first decryption key in order to execute the code. According to embodiments of the current disclosure, this section of protected code may only be stored in its decrypted state within the cache of the CPU.

Additionally, when encrypting a product source code, the encryption module component may inject elements of the runtime code and data-structures into the created executable. Accordingly, the resulting executable may be operable to load, run and automatically kick-start the runtime module component and execute successfully, if the correct decryption key is available from the authority server. Since the encryption may use modern cryptography, such as using Advanced Encryption Standard (AES) or the like, reverse engineering of the critical encrypted functions may not be possible, as the industry considers AES or the like to be practically unbreakable.

As appropriate, once associated software is executed, the runtime module component established secured communication channel with the authority server to obtain the associated decryption key for software operability, as described hereinafter in FIGS. 1 and 2. Accordingly, for providing the necessary decryption key, the authority server may validate the request is arriving from a "real" target computer system and not from a virtual machine. As appropriate, any requests from a virtual machine, emulator, simulator or any possibly running hypervisor, may be rejected.

Where appropriate, the authority server may further validate that the target computer system is equipped with operating system (OS) running a known OS kernel.

Additionally or alternatively, the authority server may validate that the target computer is clean of potentially malicious drivers.

Additionally or alternatively, the authority server may validate that the target computer system is representing an authorized/licensed user, namely, a paying customer.

It may be noted that the kernel driver must be initially installed on a target computer system, using conventional driver installation methods.

It may further be noted that the kernel driver may be freely distributed, in various forms such as part of a protected software installation process or the like.

Systems and methods of the disclosure are not limited to the details of construction and the arrangement of the components or methods set forth in the description or illustrated in the drawings and examples. The systems and methods of the disclosure may be capable of other embodiments or of being practiced or carried out in various ways.

Alternative methods and materials similar or equivalent to those described hereinafter may be used in the practice or testing of embodiments of the disclosure. Nevertheless, particular methods and materials are described herein for illustrative purposes only. The materials, methods, and examples are not intended to be necessarily limiting.

System's Embodiments:

Reference is made to the system block diagram of FIG. 1 showing schematic distributed system architecture representation 100 of the main module components.

The distributed system's architecture 100 may provide the platform for various secured software functionalities such as software integration, encrypted packaging, software triggering and flow management, providing secured communication channel to allow run-time authentication, obtaining/storing/hiding of decryption keys, validation and product integrity checking and the like.

The distributed system's architecture 100 includes an encryption module component 102 operable to integrate with the product development environment, a runtime module component 104 and an authority server component 106, configured to manage secured communication channel with a client computer system providing decryption key, to allow secured functioning and operability of the encrypted code sections. The runtime module component 104 further includes two sub-components: an injected code sub-component 108 and a kernel driver sub-component 110.

Figure 2:
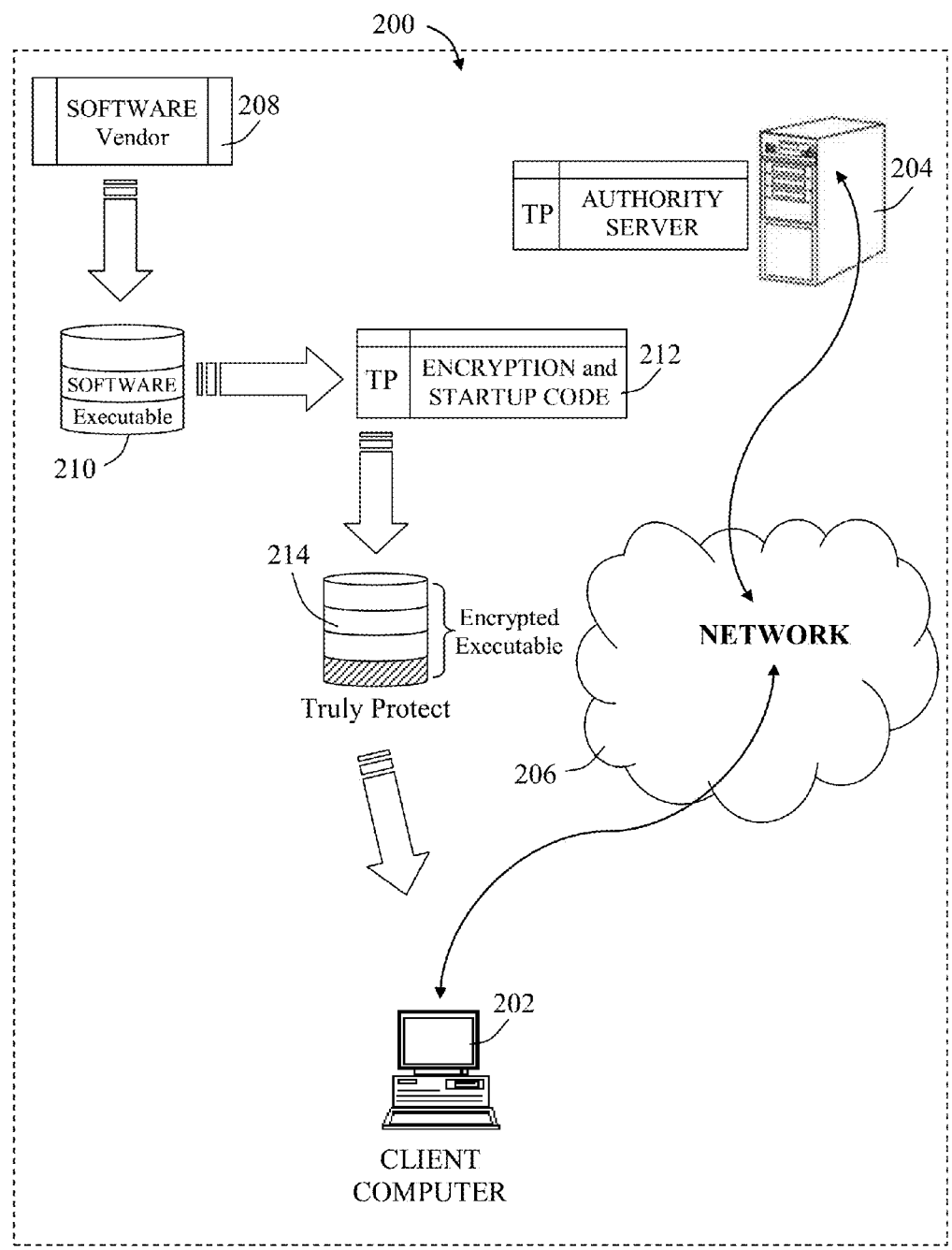
FIG. 2 is a schematic block diagram of the main components of a distributed computing system supporting software copy-protection used for secure software distribution.

The encryption module 102 may inject the runtime sub-component 108 including runtime code elements and data-structures into the software executable 212 (FIG. 2). The resulting encrypted software executable 216 (FIG. 2) may be operable to load, run and automatically kick-start the runtime module. The second sub-component 108 of the runtime module may be operable as a kernel driver, functioning in the kernel space and may be operable to establish a secured communication channel with the authority server, to manage handling of the decryption keys, for example.

Optionally, the decryption key may be obtained upon every request to decrypt an encrypted code segment.

Alternatively, or additionally, the decryption key may be obtained and stored in a CPU register for further usage. Accordingly, upon the next request for the decryption key, may verify the availability of the key in the CPU register and only if not present, a further request may be issued to the authority server 106. Optionally, the number of uses of a stored decryption key may be limited such that the decryption key is deleted from the registry when the number of usages exceeds a maximum threshold number. Once the maximum threshold is reached, the decryption key may be automatically deleted and upon the next request a new decryption key may be obtained from the authority server, possibly following a verification procedure.

Reference is now made to the system block diagram of FIG. 2 showing schematic representation of the main components of a distributed computing system 200, based on disclosure's module components, supporting software copy-protection used for secure software distribution. According to various embodiments, such a software distribution system may for example be used for distributing media such as gaming software, audio software, video software, application software and the like.

The distributed computing system 200 may be used to facilitate the authentication of a client computer system to provide protected license checking while supporting functionality of hiding the decryption keys and secured operability of a third party software products' vendor.

The distributed computing system 200 includes a client computer 202, in communication with an authority server 204 through communication network 206. The software vendor 208 produces a software product comprising a set of executable computer instructions 210 coupled with injected encrypted startup code 212 to form an encrypted executable product 214.

The distributed computing system 200 may provide an integrated environment for a third party software product vendor to allow encapsulating a software product with encrypted functionality to avoid hacking and miss-use of the software product. The distributed computing system 200 may provide various functionalities such as software integration, encrypted packaging and run-time protection.

The software product vendor 208 may integrate its development environment with the encryption and runtime modules to allow the product source code to produce encrypted instead of standard executable machine code. Additionally, the encryption module may be used to inject into its vendor's product executable 210 the required runtime code and data-structures such as start-up code and the like 212 to provide an encapsulated encrypted product 214 operable to run on a client computer system 202 with the desired protected functionality of the vendor's product.

Accordingly, when the vendor's product 214 is activated on the client computer, the injected code interacts internally with the pre-installed kernel driver, in a kernel-mode context and communicating with the remote authority server to obtain the necessary decryption key, allowing for proper functionality of the vendor's software product.

It is noted that the system may be used for protection of gaming software such as war games, sports, gambling and all other games. Included are games played by a single person, games played synchronously by multiple players, and games played non-synchronously by multiple players. In this context, "played synchronously" means either that multiple players are acting at the same time, or players respond to each other essentially in real-time.

It is further noted that the distributed computing system 200 may support various software and gaming products operable on various computer operating systems (OS), and may further include support for communication devices such as mobile communication devices, handheld devices, tablet computers and the like.

Accordingly, the distributed computing system 200 may be operable to share various software applications. Such software applications may include, for example, gaming, use of graphics, picture, video, text, music files supporting various file formats, multimedia files, combinations thereof or any other data type files, including data collection files and the like.

Figure 3:
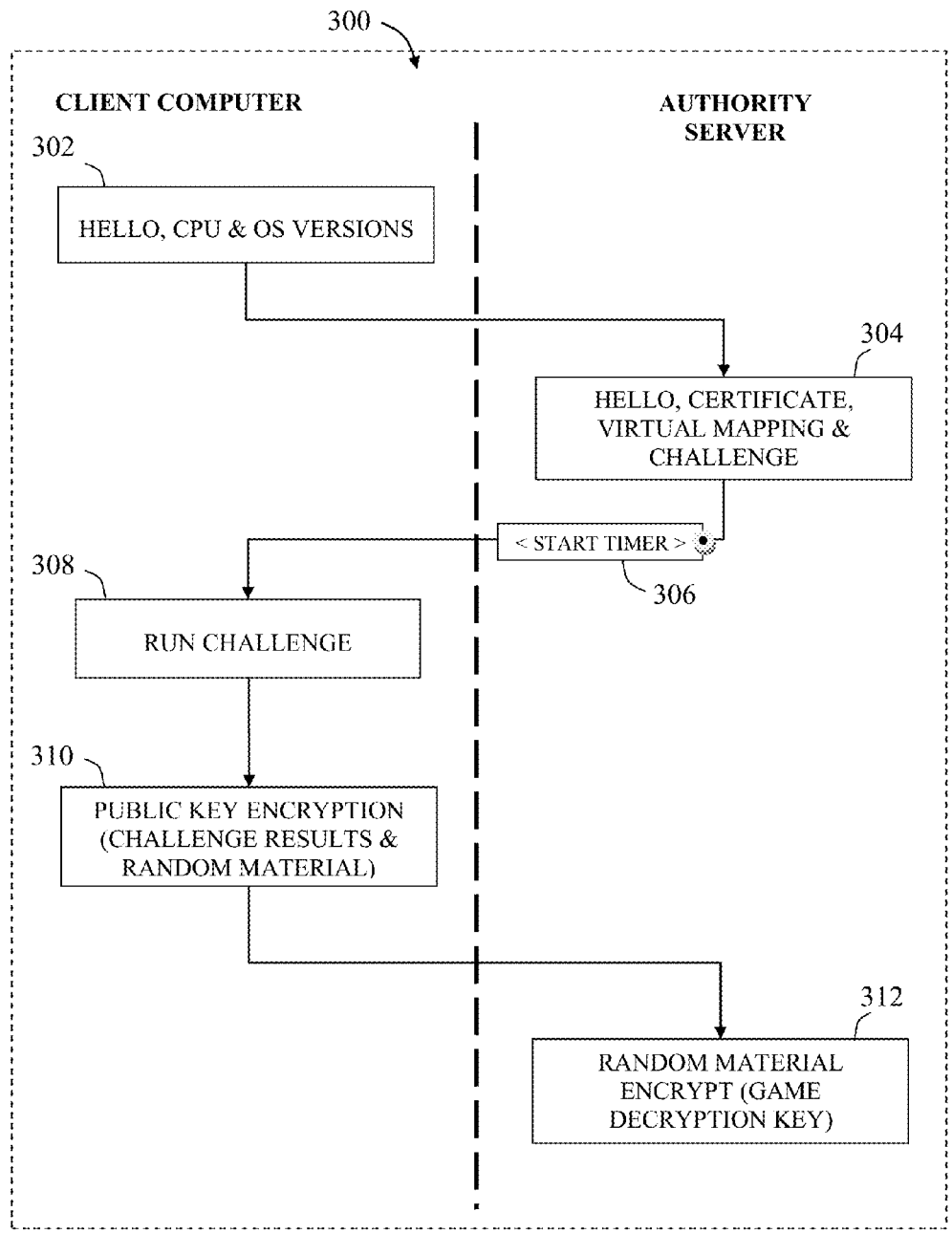
FIG. 3 is a flowchart representing selected actions of a method for performing key exchange communication between a client system computer and an authority server.

Reference is now made to the flowchart of FIG. 3 representing selected actions of a method for performing key exchange communication between a client computer system and an authority server in a distributed computer system 300.

Executing a protected software function requires a decryption key for the software on the client computer system side for decrypting the encrypted section, making the protected software operable. Such decryption key may be obtained from the authority server. Thus, when the software code is executed, the runtime module residing on the client computer system may be triggered to establish a secured communication channel with the authority server, over Public Key Infrastructure (PKI). The authority server may provide the requested decryption key, based upon a successful validation process. The validation process may comprise checking various parameters applicable to the target client computer, such as: target client computer is a "real machine", not a virtual machine, emulation or the like; target client computer is running a known OS kernel; target client computer is clean of potentially malicious drivers; the user is an authorized/licensed customer and a combination thereto.

The secured communication channel over PKI between the client computer system and the authority server guarantees the privacy of the information exchanged between the two entities. The client computer system may communicate ID information of the client target computer, identifying the owner, providing additional target computer environment parameters and kernel OS version currently running. The authority server may respond by sending a challenge function to be executed by the kernel-mode driver portion of the client target computer. The challenge function may involve check-summing critical portions of the client target computer's memory, and may further monitor several hardware side-effects.

Where appropriate, the challenge response may be configured to timeout by the authority server, such that a correct result within a predetermined period constitutes proof of the validation process, namely being a real machine running a known OS kernel. It may further verify that the correct version of the runtime module is executing on the client target computer. The challenge code may be generated by the authority server and may contain a pseudo-random component, making every challenge different, avoiding any replay-attacks. The runtime module, as a trusted computer, may further verify that client target computer is clean of potentially malicious drivers, by scanning the target machine.

The method for performing key exchange communication between a client computer system and an authority server in a distributed computer system 300 may include sending an initiation message of introduction by the client computer system containing CPU and operating system (OS) parameters for identification—step 302; The authority server may respond to client's introduction with a message containing its certificate, virtual mapping parameters and a challenge function—step 304; which may be run on the client computer system—step 308 after a timer is activated—step 306; the public key encryption may be encapsulated with the results of the challenge function with additional material transmitted to the authority server side—step 310; and the encrypted random material received on the authority server side, and decrypted—step 312 as part of the identification process;

It is noted that the client computer system may check the authority server certificate's validity period, for example. If the current date and time are outside of a range, the licensing process may not go any further.

Figure 4A:
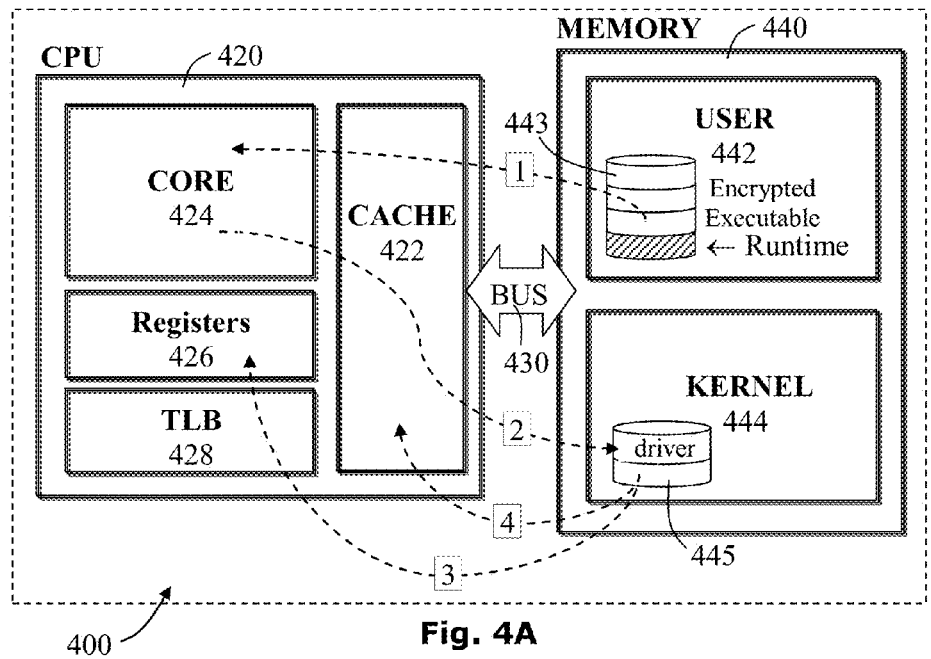
FIG. 4A is a schematic block diagram representing the main components of a client system CPU configured with a kernel driver combined showing a possible execution flow of protected code instructions.

Reference is now made to the schematic block diagram of FIG. 4A representing the main components of a client system's CPU 400 configured with kernel driver, operable to execute encrypted data-blocks combined with superimposed execution flow steps.

It is noted that the term "client system" refers to any kind of consumer data unit having a memory region and a region for processing digital information such as a software program, blocks of data, or any other digitally stored information including but not limited to applications such as video, audio, or gaming programs, and including gaming programs played synchronously and non-synchronously among two or more participants.

It is further noted that the superimposed directional arrowed lines, indicating the encrypted code execution flow, marked 1 through 4 is further expanded and described hereinafter in FIG. 4B, in a form of a flowchart.

The processor architecture may allow the CPU to operate in two modes: kernel mode and user mode and where appropriate, the hardware instruction allows switching from one mode to the other. Accordingly, when the CPU is running in user mode, the CPU may access memory in user space only, and any CPU attempts to access memory in kernel space, results in a "hardware exception". The kernel space is strictly reserved for running the kernel, kernel extensions, and most device drivers. Thus, installing the kernel driver in the kernel space provides the kernel driver with higher priority in managing the protected data-blocks and may have full access to all memory and machine hardware.

The client CPU system 400 includes main components of a CPU 420 and a main memory 440 connectable through a system bus 430. The CPU 420 may further include a Cache component 422, a CPU Core component 424, CPU set of registers 426 and CPU TLB (Translation Look-aside Buffer) 428. The main memory 440 may further include the user space 442 and the kernel space 444, which may optionally be independent and implemented in separate address spaces. The user space 442 may contain the encrypted executable code including the runtime module section 443, while the kernel space 444 may be hosting the installation of the kernel driver 445.

The CPU Core component 424 may be configured as the processing unit which reads in instructions to perform specific actions, while CPU TLB 428 is used to map virtual addresses to physical addresses, commonly in a form of a table in the processor memory, enabling faster computing by allowing the address processing to take place independently from the normal address-translation pipeline.

The execution flow may start with the loading of the next encrypted segment 443 to be executed from the user space 442 to the CPU Core 424—step 1; the CPU delegates the encrypted segment to the kernel driver 445 in the kernel space 444—step 2; the kernel driver then, shuts down pre-emption and all interrupts, while interacting with CPU registers 426—step 3; retrieves the decryption key from the registry; and with the retrieved decryption key, optionally may be retrieved from the authority server (not shown) if not already stored in one of the CPU registers 426, decrypts the encrypted segment, placing it into the CPU Cache 422—step 4; allowing the instructions of the decrypted segment to run in the kernel driver context. Subsequently, the CPU Cache 422 is discarded and the kernel may restore pre-emption and interrupts.

Figure 4B:
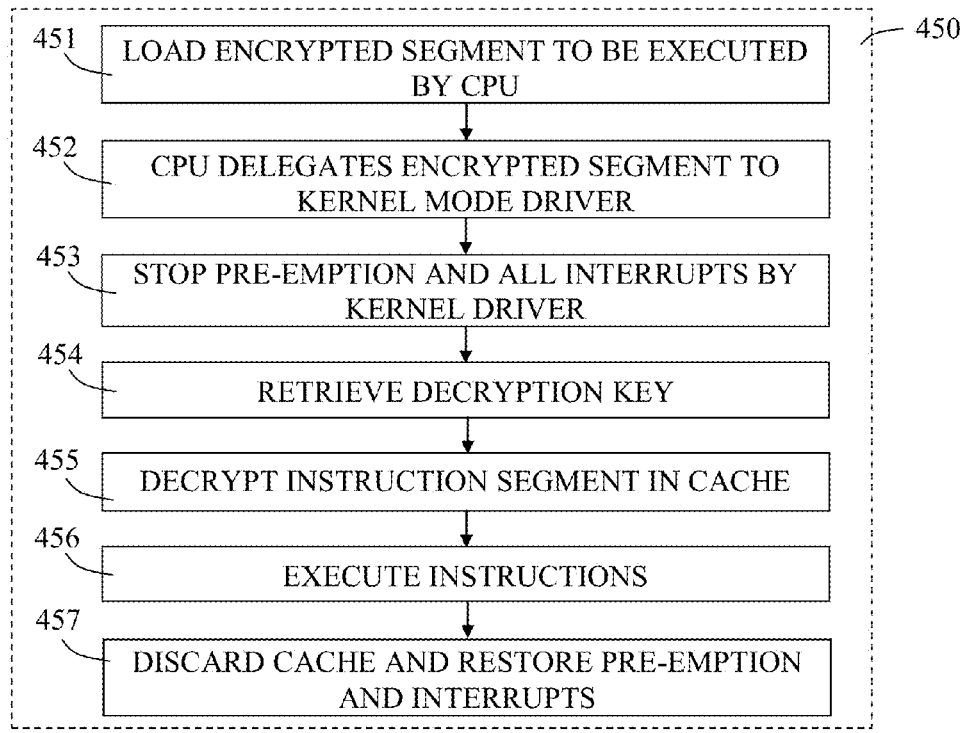
FIG. 4B is a flowchart representing selected actions of a method for executing encrypted code instructions in a processor's CPU.

Reference is now made to the flowchart of FIG. 4B representing selected actions of a method 450 for executing encrypted code instructions in the client system's CPU.

It is noted that the method 450 may be operable on a client system's CPU 400 configured with kernel driver as described hereinabove in FIG. 4A. The method may be used to change the state of section instructions from an un-executable or encrypted state to an executable or unencrypted state.

The encrypted instruction code segment may be executed on the target computer by runtime module upon completion of the decryption process. As appropriate, after the authority server positively validates the target computer, as described hereinabove, the authority server may transfer the appropriate decryption key over a PKI-secure communication channel. The distributed computer system may be configured to store the decryption key in privileged (protected) registers and may also be configured to monitor and prevent accessing these registers for the duration of the software execution. The distributed computer system then disconnects the communication link to the authority server and execution of the protected software may commence.

When the CPU reaches an encrypted section in an un-executable state but that it needs to execute, the runtime module is invoked, using the obtained decryption key to perform the decryption of the machine instructions and to render the instructions executable.

It is particularly noted that the instructions in the CPU cache, while in an executable state, the unencrypted instructions are not stored to memory. The CPU may execute the decrypted instruction directly from cache, under the context of the kernel-mode driver, under no-preemption and all-interrupts-disabled mode. It may subsequently discard the cache contents just before normal control is returned to the system software.

The decryption key and decrypted machine-code segments may be locked in the CPU and may never be placed on the CPU BUS or stored to external memory. Therefore, malicious users may only have access to the code whose critical segments are encrypted. This property of the current disclosure may prevent the making of copies for unauthorized distribution or bypassing critical code sections such as license check.

Referring to FIG. 4B, the method for executing encrypted code instructions in the client system CPU 450 may include the steps of: loading the encrypted code segment into the CPU Core (424, FIG. 4A) from the user space (442, FIG. 4A) to be executed by the CPU—step 451; the CPU may then delegate the encrypted code segment to the kernel driver (445, FIG. 4A), residing in the kernel space (444, FIG. 4A)—step 452; at this stage, the kernel driver may perform two subsequent steps: the first one is shutting down pre-emption and all interrupts—step 453 and retrieving the decryption key—step 454 from the authority server (not shown); using the decryption key to decrypt the encrypted code instructions, placing the decrypted instruction segment into the memory cache (422, FIG. 4A)—step 455; executing the decrypted instruction segment under the kernel driver context—456; and upon completion of code segment execution, discarding the memory cache and restoring pre-emption and interrupts—step 457.

Optionally, the decryption key may be obtained from the authority server (206, FIG. 2) and thereafter stored in a CPU register (426, FIG. 4A) for further usage. The next request for a decryption key, may verify the availability of the decryption key in the CPU register (426, FIG. 4A) and only if not available, a further request may be issued to the authority server.

Optionally again, the decryption key may be obtained from the authority server (206, FIG. 2) upon every request for decrypting an encrypted code segment.

Figure 5A:
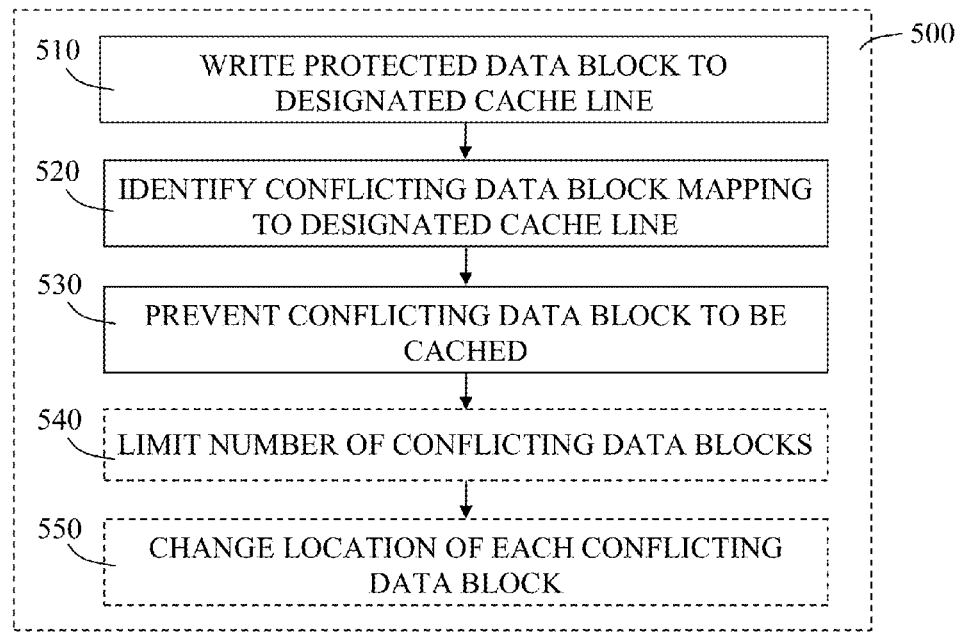
FIG. 5A is a flowchart representing selected actions of a method for preventing a protected data-block from being evicted from a CPU memory cache.

Reference is now made to the flowchart of FIG. 5A presenting selected actions of a method 500 for preventing a protected data-block from being evicted from a CPU memory cache. It is noted that this method may be used to change the state of a cache line from a non-protected state to a protected state for as long as a decrypted data block is stored therein.

The CPU memory cache (422, FIG. 4A) is a partial mirror-image of a portion of computer's main memory (440, FIG. 4A), comprises a plurality of cache-lines, where each cache-line comprises a plurality of data-blocks, of fixed size, tagged with the memory address of the data-block. The CPU memory cache is faster than main memory, thus requiring maximizing its utilization, in particular as the content of the memory cache is changing when new instructions or data are required. As appropriate, freeing space for new entries into the cache follows the current cache eviction policy, as described hereinafter.

Accordingly, running the protected code segment, requires placement into memory cache the decrypted instructions set, thus the set of data-blocks in memory cache needs to remain cached, disallowing eviction of the decrypted data-blocks. It is a particular feature of the current disclosure to change the state of the cache line storing the decrypted data-block from non-protected to protected state by identifying the conflicting data-blocks, which map to the protected memory cache-line, making them un-cacheable.

The method for preventing a protected data-block from being evicted from a CPU memory cache 500 may include the steps of: writing the protected data-block to a designated cache-line—step 510; identifying at least one conflicting data-block having a mapping indication to the designated cache-line—step 520; and preventing the at least one conflicting data-block from being cached—step 530.

The CPU may use the memory cache to store instructions that are repeatedly required to run programs, improving overall system speed with the average time to access memory reduced, thus crucial in terms of computer performance. The content of the memory cache is constantly changing upon computer program execution, requiring replacement functionality of data-blocks. Freeing space in the memory is performed according to the associated "replacement policy", also termed "eviction policy". The eviction policy dictates which data blocks currently in memory cache will be evicted by any new data block that gets fetched in. When the CPU needs to store a new block of data in the cache, it may need to determine the cache-line that corresponds to the memory address of the block, further check whether the cache-line is full, thereafter, may evict a data block according to its eviction policy to allow for placing a the new data-block in the freed space.

Eviction policy may use various methodologies, such as random replacement, First in First out (FIFO), Last in First out (LIFO) or a combination thereto.

Protected data blocks that are encrypted, such as may be associated with licensing check, may need to remain in cache whilst in a decrypted state so as to avoid being vulnerable to attack, copying, hacking or the like.

For example, given a data-block B, the set of all blocks of data that may conflict with B may be denoted by C(B), that is, C(B) is the set of data blocks that may potentially share a cache-line with B. In order to guarantee that data blocks are not altered even if the memory is modified, the current disclosure may store the data-blocks in the CPU.

In order to load data block $B_1, B_2, \ldots B_k$ to the memory cache it is sufficient to access those blocks of data. In order to make sure that these data-blocks will not be evicted by future accesses to other data-blocks, the current disclosure changes the cache lines in which protected data block are stored to a protected state, thereby making the regions of memory that contains the conflicting blocks of data $C(B_1)$, $C(B_2) \ldots C(B_k)$ non-cacheable.

Additionally or optionally, the method for preventing a protected data-block from being evicted from a CPU memory cache 500 may include the step of limiting the number of conflicting data-blocks—step 540. More specifically, it is aimed that for every 'i', each data-block Bi, may conflict with only a partial number "L" of data-blocks of the set $B_1, B_2, \ldots B_k$. The "L" parameter, may reach a maximum value of data-blocks in each memory line.

Additionally or optionally, the method for preventing a protected data-block from being evicted from a CPU memory cache 500 may further include the step of to changing the locations of the conflicting data-blocks, such that the conflicting data-blocks $C(B_1), C(B_2) \ldots C(B_k)$ become non-conflicting—step 550.

Figure 5B:
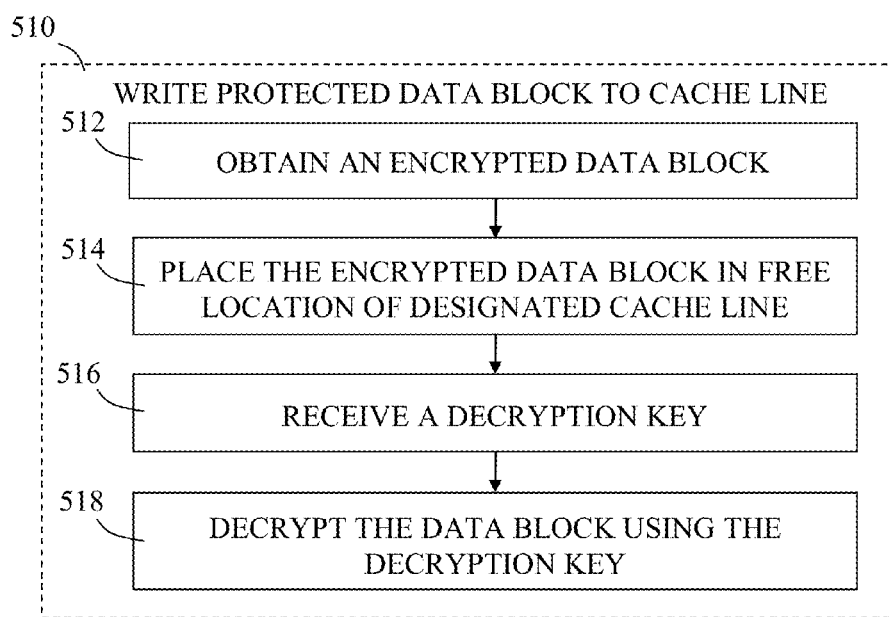
FIG. 5B is a flowchart representing selected actions of a method for writing a protected data-block into a CPU memory cache.

Reference is now made to the flowchart of FIG. 5B presenting selected actions of a method 510 for writing a protected data block into the CPU memory cache-line.

It may be noted that prior to writing the protected data-block, the execution instruction may further check whether the cache-line is full, and may evict a data block according to its eviction policy, as described hereinabove, to allow for placing the protected data-block in the freed space.

The method for writing a protected data-block to memory cache line 510 may include the steps of: obtaining an encrypted data-block—step 512; placing the encrypted data-block in a free location of designated memory cache line—step 514; receiving a decryption key, from the authority server (not shown)—step 516; and decrypting the encrypted data-block with the decryption key—step 518.

Figure 5C:
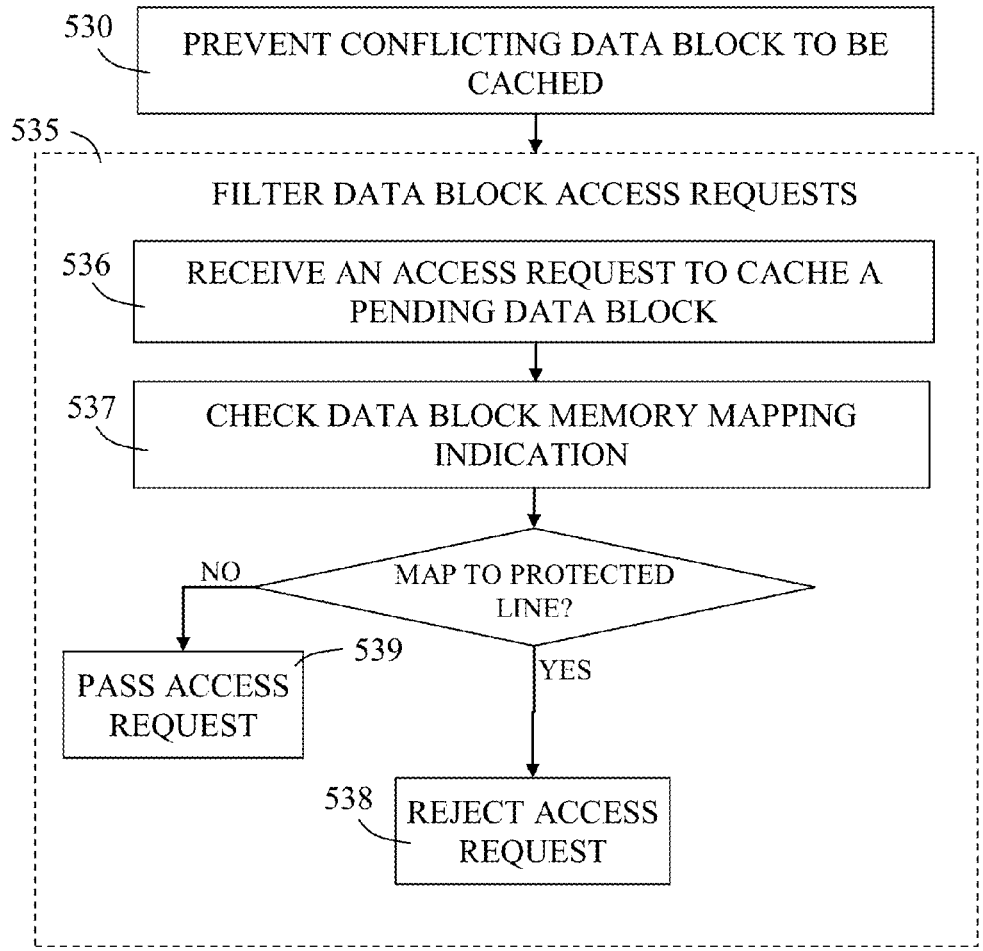
FIG. 5C is a flowchart representing selected actions of a method for preventing conflicting data-block from being cached.

Reference is now made to the flowchart of FIG. 5C presenting selected actions of a method for preventing conflicting data block to be cached 530.

A memory cache-line may contain a data field storing data from computer's memory and a tag field, storing the memory address of the data-block. The memory system may use cache mapping methods to quickly address memory references and determine if a given address is in the memory cache.

By way of example, there are three popular methods of mapping addresses to cache locations: Fully Associative Mapping, Direct Mapping, and Set Associative.

Wherein referenced Direct Mapping, main memory locations may only be copied into one location in the cache. This may be accomplished by dividing main memory into pages that correspond in size with the cache.

Wherein referenced Fully Associative Mapping, main memory locations may be placed anywhere in the memory cache, and if full, then a replacement algorithm may be used to determine which data-block in the cache gets evicted by the new data-block.

Wherein referenced Set Associative Mapping, blocks of main memory data may still map into as specific set as with Direct Mapping, but they may now be in any N-cache block frames within each set.

Additionally, it may be noted that the writing of a conflicting data block into the CPU memory cache-line is possible according to current "caching access policy" (known also as cache placement policy), unless overridden by an UN-CHACHEABLE flag associated with the data block to be written.

The caching access policy may be associated with cache updating with new data, or allocating a new data block in the cache if a specific write is a write miss (data block not in the cache).

By way of illustration, only, there may be two main caching access policies related to updating the cache with new data: (a) a Write-Through (WT) policy, and (b) a Write-Back (WB). The Write-Through (WT) policy "writes" that go to the cache are also "written through" to the next level in the memory hierarchy. The Write-Back (WB), "writes" go only to the cache, and are not (immediately) written through to the next level of the hierarchy.

Further, there may be two additional caching access policies related to allocating a new block in the cache, if a write misses: (a) a Write-Allocate (WA) policy, and (b) a Write-No-Allocate (NA). The Write-Allocate (WA) is typically used with the Write-Back (WB) policy. The Write-No-Allocate (NA) must be used in conjunction with Write-Through (WT).

Accordingly, as an example, the cache policy encoding, may use for a memory region configured as a cacheable memory, a memory attribute for encoding the policy. For example, a single bit flag may indicate whether a data block is in a NON-CACHEABLE state or CACHEABLE state, in still another example a two bit memory attribute may be used to indicate: [00] cache policy to be Non-Cacheable; [01] cache policy to be Write-Back, Write-Allocate; [10] cache policy to be Write-Through, No Write-Allocate; and [11] cache policy to be Write-Back, No Write-Allocate, accordingly, the [00] indication may be used to flag an NON-CACHEABLE state. Still other memory attribute coding protocols may be used as required.

The current disclosure allows for interacting with the memory system mapping methods to determine relevant memory cache locations, disallowing access requests which may cause eviction of protected data blocks.

The method for preventing conflicting data block to be cached 530 may further include a method for filtering data-blocks for access requests 535.

The method for filtering data-blocks for a access request 535 may include the steps of: receiving a access request to cache a pending data block—step 536; checking data-block memory mapping indication of pending data-block—step 537; and if the pending data block has a memory mapping indication matches to the designated cache-line, then rejecting access request—step 538, and otherwise passing the request to the cache so that the non-conflicting data block is stored—step 539.

Figure 6A:
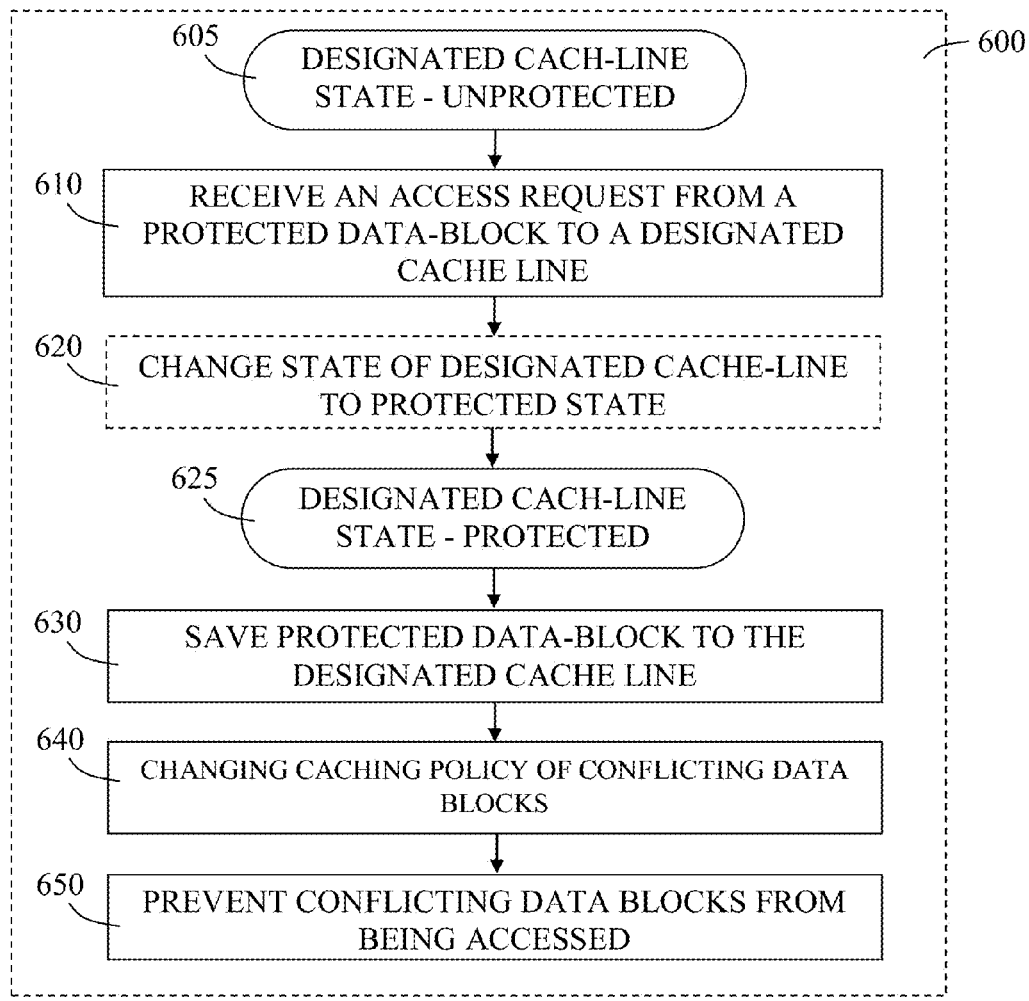
FIG. 6A is a flowchart representing selected actions of a method for protecting a line of a CPU memory cache from an access request that may expose protected data to a malicious activity.

Reference is now made to the flowchart of FIG. 6A presenting selected actions of a method for protecting a line of a CPU memory cache 600 from an access request that may expose protected data to a malicious activity. It is noted that this method may change the state of a cache line from a non-protected state to a protected state for as long as a decrypted data block is stored therein. Accordingly, the change of state may apply when the first protected data block is written into the memory cache.

The method for protecting a line of a CPU memory cache 600 may start with the designated cache line in a non-protected state 605, and may include the steps of: receiving an access request from a protected data block to the designated cache line—step 610; optionally, upon identifying of loading of a protected data block (encrypted code), the state of the designated cache line may change into a protected state—step 620 denoted in the flowchart as protected state 625; saving the protected data-block to the designated memory cache line, after decrypting the protected (encrypted) data-block—step 630, in a free location; changing caching access policy of conflicting data-blocks in the designated cache—step 640; and preventing conflicting data blocks from being accessed in the designated cache line—step 650.

Figure 6B:
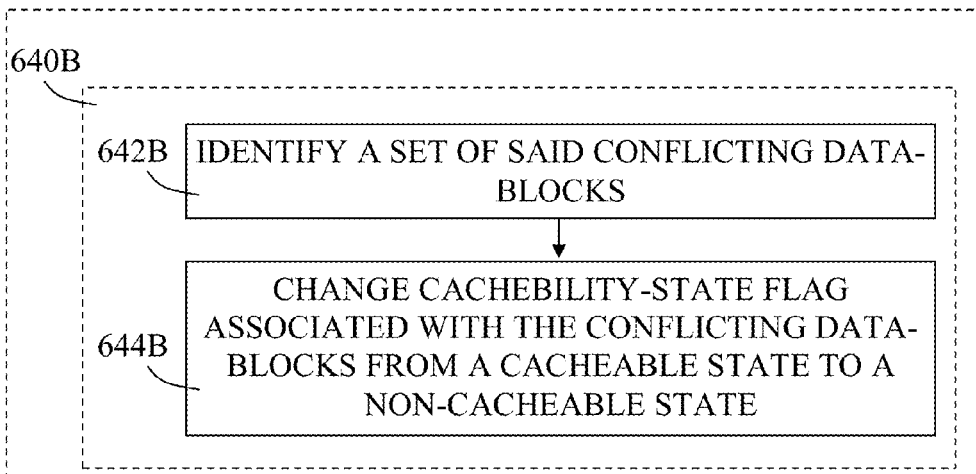
FIG. 6B is a flowchart representing selected actions of a method for changing caching access policy.

Reference is now made to the flowchart of FIG. 6B presenting selected actions of a method for changing caching access policy 640B.

The method for changing caching access policy 640B may include the steps of: identifying a set of conflicting data-blocks—step 642B; and changing the cacheability state flag associated with each data-block of the set of conflicting data-blocks from a cacheable state to a non-cacheable state—step 644C.

It may be noted that wherein referenced non-cacheable state, may be configured to use the existing current caching access policies, such as Write-back, Write-through and may further be coupled with write-allocate, where appropriate.

Figure 6C:
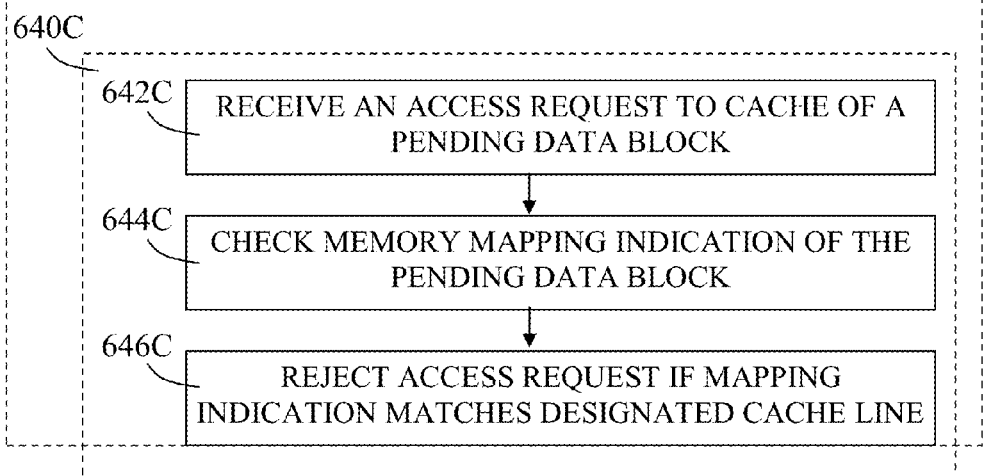
FIG. 6C is a flowchart representing selected actions of a method for filtering data-block access requests.

Reference is now made to the flowchart of FIG. 6C presenting selected actions of a method for filtering data-block access requests 640C.

The method for filtering data-block access requests 640C may include the steps of: receiving an access request for a pending data-block—step 642C; checking the memory mapping indication of the pending data-block—step 644C; and rejecting the access request, if the mapping indication of the pending data-block is of the designated cache line—step 646C.

Figure 7:
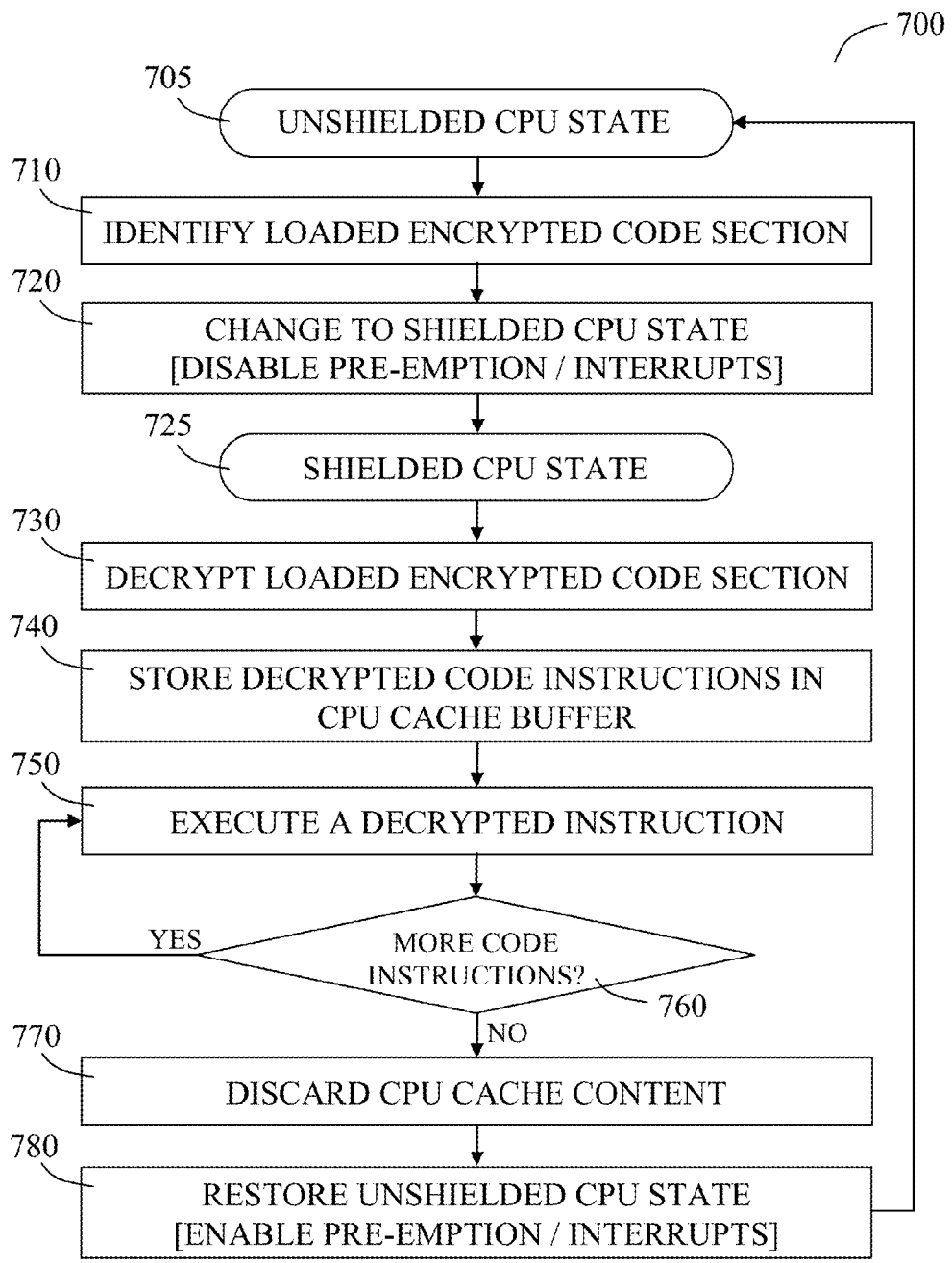
FIG. 7 is a flowchart representing selected actions of a method for buffered execution of encrypted code section.

Reference is now made to the flowchart of FIG. 7 presenting selected actions of a method for buffered execution of encrypted code section 700.

Modern computer architecture is CPU interrupt driven, where the interrupt mechanism may suspend the currently executing process to invoke a scheduler, determining the next process to be executed. Furthermore, preemption is the act of temporarily interrupting a task being carried out by a computer system without requiring cooperation of the interrupted task, which may be resumed at a later time, thus losing control over CPU cache content. Such a change may normally be carried out by a privileged task or part of the system known as a preemptive scheduler, which has the privilege to preempt, or interrupt.

It is noted, that the control of the current state of the CPU, and identification when an encrypted code section is loaded into the CPU cache is a specific feature of the current disclosure and may change CPU state, to a shielded state, for example to allow secured execution of critical code sections.

Moreover, the protocol stack execution of existing methods decrypts a single encrypted instruction at a time, so an instruction that is executed in a loop, may get decrypted on every iteration of the loop, making buffering a possible technique to eliminate the possible degradation of the computer system performance.

It is particularly noted that although the CPU may buffer these instructions in its cache in an executable state, the decrypted instructions are not stored to memory. The CPU may execute the decrypted instruction directly from cache, under the context of the kernel-mode driver, under a SHIELDED state of no-preemption and all-interrupts-disabled mode. It may subsequently delete the cache content just before normal UNSHIELDED state of CPU is resumed and control is returned to the system software.

It is noted that the buffer holding the decrypted code instructions may be a page in memory configured as a cacheable page, and as such any writing request reaches the cache, but is not written into the main memory.

This cycle of decrypt-execute-discard occurs for every instance of encrypted code execution, during the normal flow of the software. Which critical sections are encrypted in the instruction set may be selected carefully so as to minimize the performance hit, due to the decryption cycle, while still providing copy-protection.

The decryption key and decrypted machine-code segments may be locked in the CPU and may never be placed on the CPU BUS or stored to external memory. Therefore, malicious users may only have access to the code whose critical segments are encrypted. This property of the current disclosure may prevent the making of copies for unauthorized distribution or bypassing critical code sections such as license check.

It is noted that the decryption key may be obtained from the authority server (206, FIG. 2) each time a protected code section is being executed, if not available in a CPU register (426, FIG. 4A).

Optionally, the decryption key may be stored and locked in a CPU register (426, FIG. 4A) for as long as the protected code section is being executed and may further be discarded upon specific instruction.

The method for buffered execution of encrypted code segment 700 may start with normal UNSHIELDED CPU state 705, while performing regular computer processes and activities or executing computer software programs.

The method 700 may include the steps of: identifying a loaded encrypted code section—step 710, by the resident runtime module of current disclosure; therefore, the CPU state may be change to a different state, shielded state—step 720; resulting in a shielded state 725 where pre-emption and all interrupts are disabled; decrypting the loaded encrypted code section—step 730, possibly using the decryption obtained from the authority server (206, FIG. 2) and stored in the CPU registers (426, FIG. 4A); storing the decrypted code instructions in a CPU cache buffer—step 740; and further executing code instruction obtained from the buffer—step 750; this step is continuously repeated as long as there are more code instructions buffered for execution; if no additional code instructions are available in the buffer—step 760; then CPU cache content is cleared and discarded—step 770; restoring normal UNSHIELDED CPU state—780 by enabling pre-emption and all interrupts.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claim is:

1. A method for executing an encrypted code section in a CPU memory cache, said encrypted code section comprising a plurality of encrypted code instructions, the method comprising:

writing said encrypted code section to said CPU memory cache;

changing said CPU memory cache into a shielded state characterized by preemption and a CPU interruption being disabled;

decrypting said encrypted code section;

storing decrypted code instructions of said encrypted code section in said CPU memory cache; and executing said decrypted code instructions from a designated cache-line of said CPU memory cache in the shielded state.

2. The method of claim 1, further comprising deleting said decrypted code from said CPU memory cache following execution of said decrypted code.

3. The method of claim 2, further comprising restoring said CPU memory cache to an unshielded state following the deleting of the decrypted code.

4. The method of claim 3, wherein said unshielded state is characterized by at least one of a preemption handler and a CPU interrupt handler being enabled.

5. The method of claim 1, wherein said shielded state is characterized by at least one of a preemption handler and a CPU interrupt handler being disabled.

6. The method of claim 1, wherein said decrypting said encrypted code section further comprises obtaining an encryption key, wherein said encryption key stored in a CPU register.

7. A system for executing an encrypted code section in a CPU memory cache, said encrypted code section comprising a plurality of encrypted code instructions, the system comprising:
   a CPU comprising a shieldable CPU cache component; and
   a main memory connected to said CPU via a system bus;
   wherein said CPU performs functions to write said encrypted code section to said shieldable CPU memory cache and to set said shieldable CPU memory cache to a shielded state characterized by preemption and a CPU interruption being disabled;
   and wherein said CPU further performs functions to decrypt said encrypted code section and to store decrypted code instructions such that said decrypted code instructions are executed from a designated cache-line of said CPU memory cache in the shielded state.

8. The system of claim 7, wherein said CPU is further operable to delete said decrypted code from said CPU memory cache following execution of said decrypted code.

9. The system of claim 8, wherein said CPU is further operable to restore said CPU memory cache to an unshielded state following the deleting of the decrypted code.

10. The system of claim 7 wherein said CPU further comprises a CPU Core component, a CPU set of registers and a CPU Translation Look-aside Buffer).

11. The system of claim 7 wherein said main memory further comprises a user space and a kernel space.

12. The system of claim 11 wherein said kernel space is independent and implemented in separate address spaces.

13. The system of claim 7 wherein said user space contains a runtime module section of the encrypted code.

14. The system of claim 7 wherein said kernel space hosts an installation of a kernel driver.

15. The system of claim 7 further comprising a CPU Core component comprising a processing unit operable read and execute instructions.

16. The system of claim 7 further comprising a CPU Translation Look-aside Buffer operable to map virtual addresses to physical addresses.

17. The system of claim 16 said CPU Translation Look-aside Buffer further comprising a table in the processor memory.

18. The system of claim 7 further comprising a protected CPU register storing a decryption key.

19. The system of claim 7 further comprising a CPU interrupt handler.

20. The system of claim 19 wherein said CPU interrupt handler is operable to be disabled thereby changing said CPU memory cache to the shielded state.

* * * * *